Oct. 7, 1958

L. RAMACHER ET AL 2,854,808

MACHINE FOR WINDROWING NUTS

Filed Feb. 25, 1957

INVENTORS
LESLIE RAMACHER
RUDOLPH H. RAMACHER

BY Lothrop & West

ATTORNEYS

United States Patent Office 2,854,808
Patented Oct. 7, 1958

2,854,808

MACHINE FOR WINDROWING NUTS

Leslie Ramacher and Rudolph H. Ramacher, Stockton, Calif.

Application February 25, 1957, Serial No. 641,925

4 Claims. (Cl. 56—328)

The invention relates to devices for sweeping nuts and other ground harvested crops into suitable harvesting pattern and location.

Farm labor costs have given rise to the development of machines capable of harvesting crops, such as nuts, which have become dislodged from the trees on which they have grown and have fallen to the ground below. A common defect in such machines is that they are difficult to steer and are frequently so bulky in vertical dimension as to prevent the near approach of the harvesting reel to the base of a tree. Consequently, hand-harvesting of the nuts adjacent the tree trunk, with consequent cost increase, must be resorted to.

Furthermore, owing to the unwieldiness of the conventional nut harvester a considerable number of passes must be made down the rows, and at right angles thereto, in order to harvest thoroughly.

It is therefore an object of the invention to provide a nut windrowing machine which is close-coupled or compact and which thus provides ease of maneuverability.

It is another object of the invention to provide a machine which is low in vertical elevation to permit close approach of the machine to the bases of trees.

It is still another object of the invention to provide a machine which does not depend upon carefully treated smooth ground for its efficacy but, instead, is capable of sweeping nuts out of small holes or depressions in ground which has not been smoothed with especial care.

It is a further object of the invention to provide a machine which eliminates the need for hand harvesting of nuts and similar types of crops.

It is yet a further object of the invention to provide a machine which can be directed and balanced by an operator walking behind the device, or by a person riding on a machine equipped with additional equipment for such purpose.

It is a still further object of the invention to provide a machine which efficiently marshals nuts disposed on the ground.

It is another object of the invention to provide a machine which is relatively economical to manufacture and to operate.

It is another object of the invention to provide a machine generally improved for windrowing nuts.

Other objects together with the foregoing are attained in the embodiment described in the following descriptions and shown in the accompanying drawing in which.

Figure 1:
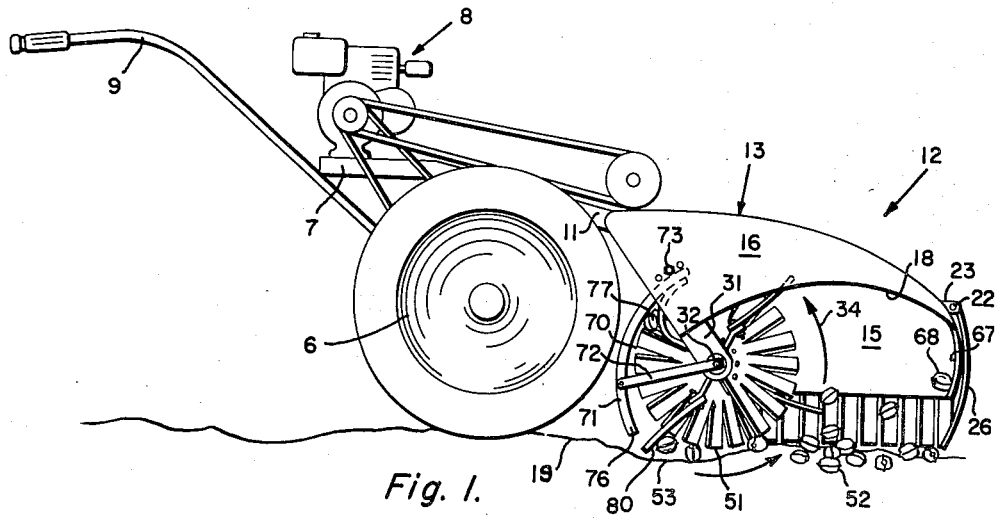
Figure 1 is a side elevation.

While the machine of our invention is susceptible of numerous physical embodiments depending upon the particular environment and requirements of use, a considerable number of the herein shown and described machines have been made, sold, and used in field and orchard operations and have operated in an eminently satisfactory manner.

Appropriately supported on a pair of ground-engaging wheels 6 is a frame 7, the wheels being driven through suitable transmisison means such as a belt or chain by an internal combustion engine 8 mounted on the frame 7. A pair of steering handles 9 not only enables the operator to guide the machine along a proper course but also to tilt the frame 7 about the transverse axis of the wheels so as to raise or lower the forward end of the frame as the situation requires.

Mounted on the forward end 11 of the frame by suitable structural members (not shown) is the windrowing unit, designated generally by the numeral 12. Preferably, the windrowing unit 12 includes a cover plate 13 or shell comprising an arcuately curved top plate 14 with a depending left hand side plate 15 and a right hand side plate 16, as appears most clearly in Figures 1 and 2. While the left hand side plate 15 extends substantially to the ground 19, particularly adjacent its rearward portion 17, the right hand side plate 16 has an opening or cut out portion 18 to permit lateral discharge of the nuts being windrowed. Depending from the forward lower portion of the plate 15, and located forwardly of the plate 17, is a serrated resilient plate 21, or skirt, which assists in channelling the nuts as the machine moves along its path and over the nuts on the ground below, the skirt 21 serving to deflect the nuts either to the right (or inwardly when viewed from the operator's position) or to the left (outwardly) so that the nuts are not crushed by the depending plate 17. In this fashion a clean delineation of the nuts on the ground is obtained without damage to the nuts.

Depending from a cross-bar 22 pivotally mounted on a pair of forwardly projecting brackets 23 secured to the side plates is a serrated flap 26, or screen, or backstop extending downwardly substantially to the ground surface. The serrations 27 in the flap permit the entry therethrough of nuts and some of the smaller branches. Larger branches and twigs are screened out and many of the leaves as well. In the event such unwanted material commences to pile up in front of the device as it is moving forwardly along a row, the operator can stop the vehicle and by swinging upwardly the screen 26 dislodge the material which has accumulated in front of it, the material being then moved to a location out of the way. The screen can thereupon be allowed to drop downwardly by gravity into the normal position shown in Figures 1 and 2 in which attitude the screen acts as a backstop to deflect downwardly any nuts flipped forwardly by the rotating portions of the machine.

Mounted transversely on the forward portion 11 of the frame is a cross beam (not shown) from the ends of which depend forwardly and downwardly at an angle a pair of arms 31. On the lower end of the pair of arms is pivotally mounted a transverse shaft 32. As appears most clearly in Figure 2, the shaft 32 is provided at its left hand end exteriorly of the plate 15 with a pulley 33, or, if preferred, a sprocket, the shaft being rotated in the counterclockwise direction indicated by the arrow 34 in Figure 1 by an appropriate V-belt 36, or chain, suitably connected to a driving wheel 37 rotated through intermediate power transmission mechanism from the engine 8.

Mounted on the shaft 32 in helical fashion is an auger 41 comprising a plurality of resilient teeth 42 secured at their base to a metal plate 40 by appropriate fastenings 43. The metal plate 40 is preferably affixed in helical fashion to a tube 35, or sleeve, mounted on the shaft 32 as by welding so as to give a secure foundation to the resilient auger 41 and to maintain the roots of the auger teeth in helical attitude. As the auger rotates in the direction of the arrow 34 the helix is suitably disposed so that the nuts engaged by the auger will be laterally moved from left to right hand direction, viewed from the operator's location, so as to discharge from the right hand side of the machine through the opening 18 as the machine moves forwardly. It is to be understood of course that some conditions of use and operation might require that discharge be made in a left-hand direction, and, in this event, the disposition of the parts shown would be reversed, in mirror fashion.

As will be seen most clearly in Figure 1, the bottom portion 51 of the arc of the auger 41 is disposed at an elevation slightly above mean ground level. Such an elevation is sufficient to permit the tips of the helically disposed resilient teeth 42 to engage with the nuts 52 and to translate the nuts laterally as the teeth successively urge the nuts endwise in auger fashion, yet not furrow into the ground except at random spots where small heaps of dirt might be encountered. The machine is therefore operated without an excessive amount of dust being generated. In the event a heavy rock or clod is met, the teeth tips resiliently bend and thus do not forcibly dislodge such unwanted material and send it to the windrow. There is thus provided a discriminating feature which renders the machine of even greater value.

Since one of the major objects of the invention resides in its ability to windrow nuts effectively even on ground which has not been carefully prepared, further mechanism is provided to dislodge nuts residing in depressions 53 in the soil. We have therefore provided in combination with the auger a plurality of sweeping fingers 61 collectively termed a sweeper. As appears most clearly in Figure 3, each of the sweeping fingers 61 includes a stiff base portion 62 affixed to the perimeter of the sleeve 35 and extending substantially radially outwardly therefrom, the outermost end 60 of each of the rigid fingers 62 being curved slightly rearwardly and having affixed thereto by appropriate fastenings 63 a resilient or semi-resilient sweeping finger tip 66. The diameter of the envelope formed by the resilient fingers 66 exceeds the diameter of the envelope 70 of the helical teeth 42 to enable the sweeping fingers to scoop downwardly into the depressions 53 and thus to sweep the nuts in the depressions forwardly, as shown most clearly in Figure 1. The sweeping motion of the fingers is often sufficient, owing to the bending of the sweeping fingers, as indicated by the finger 65 in Figure 3, to flip or toss the nuts forwardly and upwardly against the inside surface of the forward end 67 of the top cover plate 14 and into the position of the nut indicated by the numeral 68. Upon hitting the forward portion 67 of the cover plate the nut falls by gravity to the ground below and ordinarily onto a higher portion of ground where the auger can act upon the nut and thus translate the nut laterally in desired fashion. In the event the nut again falls into a depression, succeeding sweeping fingers will dislodge it from such depression and continue to do so until the nut lands on a piece of ground high enough so that it can be operated on by the auger.

Figure 2:
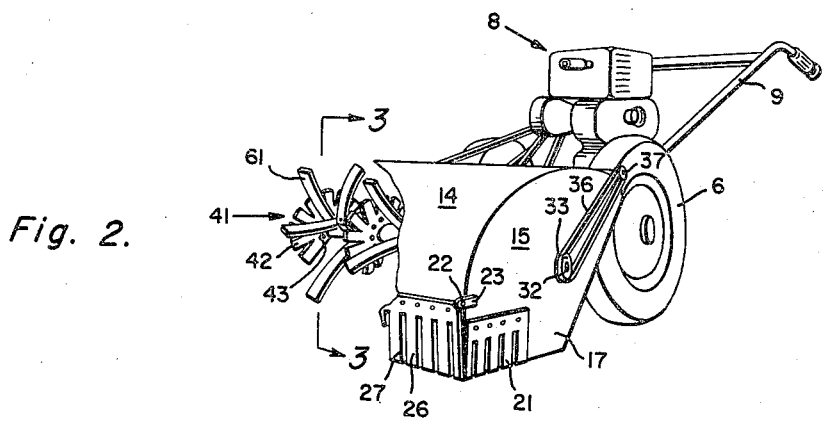
Figure 2 is a front perspective with a portion of the cover being removed to disclose the interior mechanism.

The sweeping fingers 61 are themselves placed in the interstices between adjacent portions or wings of the auger, as appears most clearly in Figure 2, and are so disposed on the shaft 32 as to be in staggered or generally helical fashion, and are spaced along the shaft in such fashion that all portions of the path are swept by the sweeping fingers. Thus, it is not possible for any nuts to become lodged in depressions which are not acted upon by the sweeping fingers.

Figure 3:
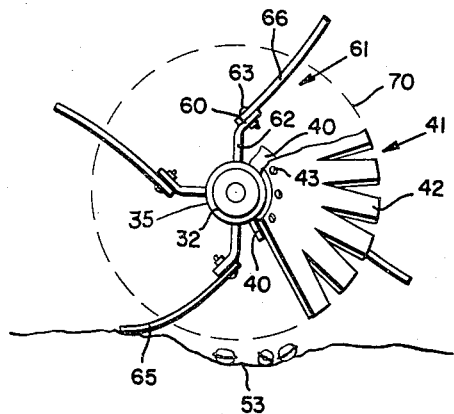
Figure 3 is a section, the plane of section being indicated by the line 3—3 of Figure 2.

While contact with the ground in itself tends to bend and thus to stress the resilient sweeping fingers to some extent, as appears in Figure 3, additional distortion of the sweeping fingers is given owing to the provision of an arcuate deflector plate 71 adjustably secured to the shaft 32 by a mounting arm 72. The deflector plate 71 can by suitable fastenings 73 passing through the side plate 16 be adjusted upwardly or downwardly to give the desired degree of deflection of the sweeping fingers and the desired clearance with respect to the auger envelope 70. The deflection plate 71 not only assists in giving the sweeping fingers 61 an additional impetus as they swing downwardly and free of the lower end 76 of the plate 71 but it also serves to deflect downwardly any nuts which have been swept upwardly in the direction indicated by the arrow 34 and to the rear side of the auger. Thus, for example, the deflector plate serves to bring back within the reach of the auger any nuts enmeshed in twigs or trash rolls and carried upwardly, over and to the back side of the auger. The deflector plate guides such rolls forwardly and downwardly and upon discharge from the lower end 76 of the deflector plate the sharply bent sweeping finger snaps to the position approximately indicated by the numeral 80, tending to break up the roll and flipping the nuts in the roll forwardly and against the forward wall 67 where they drop down and are acted upon by the auger 41 which moves them laterally to be deposited in the windrow.

While the embodiment shown herein is of the walk-behind type, it is to be noted that the machine can, by additional equipment, be used as a riding model. In this case the sweeper is preferably made tiltable with respect to the axis of the wheels 6 by appropriate levers (not shown) so that the operator can tilt the sweeper while proceeding forwardly without leaving his seat.

What is claimed is:

1. An apparatus for windrowing nuts on uneven ground comprising a frame including ground engaging wheels movable in a predetermined direction, a horizontal shaft member rotatably mounted on said frame at right angles to said direction, a cover mounted on said frame, said cover extending forwardly and downwardly over said shaft member to a location adjacent the mean level of the ground, the lowermost portion of said cover adjacent said ground being flexible to permit the passage therethrough of nuts disposed on the ground, an auger mounted on said shaft member, said auger including a plurality of inclined flexible fingers having a predetermined length such that the lower horizontal tangential plane of the envelope of said auger is substantially coplanar with the plane of mean ground level, a sweeper including a plurality of substantially radially disposed elongated flexible fingers mounted on said shaft member, said elongated fingers of said sweeper, being of a length such that the lower horizontal tangential plane of the envelope thereof is at an elevation below the plane of mean ground level, and means for rotating said shaft member in a direction such that the lowermost fingers of said auger and said sweeper move in said predetermined direction and urge the nuts located below mean ground level toward said lowermost portion of said cover.

2. A nut windrowing machine comprising a frame supported by a pair of ground-engaging wheels and movable forwardly in a predetermined direction, a horizontal shaft member rotatably mounted on said frame at right angles to said direction, means on said frame for rotating said shaft in a direction such that the lowermost portion thereof moves toward said direction, an auger mounted on said shaft member and being in light contact with the surface of the ground, a cover mounted on said frame, said cover projecting forwardly of said auger and downwardly toward the ground, a sweeper mounted on said shaft member, said sweeper including a plurality of resilient fingers mounted on said shaft member intermediate the flights of said auger, said sweeper being larger in diameter than said auger whereby nuts located below the reach of said auger are swept in said direction toward the forward portion of said cover.

3. The machine of claim 2 further characterized by a deflector plate mounted on said frame and partially encompassing the rearward portion of said auger and said sweeper, said plate being spaced from said auger and in engagement with the adjacent ones of said sweeping fingers whereby nuts located adjacent said plate are directed toward the bottom of said auger.

4. A nut windrowing machine comprising a frame movable over the surface of uneven ground littered with nuts, a windrowing auger rotatably mounted on said frame and adapted to engage with nuts located on the surface of the ground, a sweeper rotatably mounted on said frame and adapted to engage with nuts located in depressions in the ground, a cover mounted on said frame extending forwardly over said auger and said sweeper and downwardly toward the ground to confine nuts engaged by and swept toward said cover by said sweeper, and an arcuate plate mounted on said frame, the lower portion of said plate being located at a position adjacent the point of tangency of said auger and the ground.

References Cited in the file of this patent

UNITED STATES PATENTS

| | | |
|---|---|---|
| 939,765 | Walte | Nov. 9, 1909 |
| 2,250,391 | Ober | July 22, 1941 |
| 2,475,531 | Townsend | July 5, 1949 |
| 2,566,724 | Heil | Sept. 4, 1951 |
| 2,608,816 | Lembke | Sept. 2, 1952 |
| 2,634,567 | Huitema | Apr. 14, 1953 |
| 2,652,678 | Ramacher | Sept. 22, 1953 |